(12) United States Patent
Kizaki et al.

(10) Patent No.: US 11,007,796 B2
(45) Date of Patent: May 18, 2021

(54) IMAGE FORMING APPARATUS AND CONTROL METHOD

(71) Applicants: Osamu Kizaki, Saitama (JP); Junji Nakai, Kanagawa (JP); Masafumi Yamada, Kanagawa (JP); Shizuho Katahira, Kanagawa (JP)

(72) Inventors: Osamu Kizaki, Saitama (JP); Junji Nakai, Kanagawa (JP); Masafumi Yamada, Kanagawa (JP); Shizuho Katahira, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/580,859

(22) Filed: Sep. 24, 2019

(65) Prior Publication Data

US 2020/0103794 A1    Apr. 2, 2020

(30) Foreign Application Priority Data

Oct. 2, 2018    (JP) .............................. JP2018-187438

(51) Int. Cl.
*G03G 15/20*    (2006.01)
*G01K 1/02*    (2021.01)
(Continued)

(52) U.S. Cl.
CPC ............. *B41J 11/002* (2013.01); *G01K 1/026* (2013.01); *G01K 3/005* (2013.01); *G01K 3/14* (2013.01); *G03G 15/2039* (2013.01)

(58) Field of Classification Search
CPC ........... G03G 15/2007; G03G 15/2039; G01K 1/026; G01K 3/005; G01K 3/14; B41J 11/002
See application file for complete search history.

(56) References Cited

U.S. PATENT DOCUMENTS

2011/0222930 A1*  9/2011  Fujimoto ........... G03G 15/2064
                                                 399/329
2015/0132019 A1*  5/2015  Kobashigawa .... G03G 15/2053
                                                 399/67
(Continued)

FOREIGN PATENT DOCUMENTS

JP    2006-264148    10/2006
JP    2012-045849     3/2012
(Continued)

*Primary Examiner* — Matthew Luu
*Assistant Examiner* — Kendrick X Liu
(74) *Attorney, Agent, or Firm* — Duft & Bornsen, PC

(57) ABSTRACT

An image forming apparatus includes a heater, a first temperature sensor, a second temperature sensor, and processing circuitry. The heater is configured to heat a medium on which an image is formed. The first temperature sensor is configured to measure a temperature of the heater. The second temperature sensor is configured to measure a temperature of a region heated by the heater. The processing circuitry is configured to control the temperature of the heater. The processing circuitry is configured to control the heater based on a comparison between a measured temperature of the first temperature sensor and a first threshold value, and a comparison between a measured temperature of the second temperature sensor and a second threshold value.

9 Claims, 10 Drawing Sheets

(51) Int. Cl.
    *G01K 3/14*     (2006.01)
    *B41J 11/00*     (2006.01)
    *G01K 3/00*     (2006.01)

(56) References Cited

U.S. PATENT DOCUMENTS

| | | | |
|---|---|---|---|
| 2016/0091844 A1* | 3/2016 | Matsuo | G03G 15/2039 |
| | | | 399/68 |
| 2016/0231670 A1* | 8/2016 | Takahashi | G03G 15/2039 |
| 2018/0009237 A1 | 1/2018 | Sakamoto et al. | |
| 2019/0100032 A1 | 4/2019 | Nakai et al. | |

FOREIGN PATENT DOCUMENTS

| | | |
|---|---|---|
| JP | 2018-012323 | 1/2018 |
| JP | 2019-064135 | 4/2019 |

\* cited by examiner

IMAGE FORMING APPARATUS AND CONTROL METHOD

CROSS-REFERENCE TO RELATED APPLICATION

This patent application is based on and claims priority pursuant to 35 U.S.C. § 119(a) to Japanese Patent Application No. 2018-187438, filed on Oct. 2, 2018, in the Japan Patent Office, the entire disclosure of which is hereby incorporated by reference herein.

BACKGROUND

Technical Field

The present disclosure relates to an image forming apparatus, a control method, and a recording medium.

Discussion of the Background Art

Along with diversification of business forms in the printing industry, various control techniques for image forming apparatuses are required.

A technique of heating a sheet used as a recording medium in order to improve the quality of an image to be printed is known. For example, some inkjet image forming apparatuses include a heating assembly for drying ink droplets ejected on the surface of a recording medium. In a laser image forming apparatus, a recording medium is usually heated to fix toner. In particular, large-sized sheets are sometimes used as recording media in image forming apparatuses for industrial use, and appropriate temperature control of the recording media is required.

When a recording medium has an inappropriate temperature and uneven temperature distribution, the recording medium is subject to local thermal expansions, and cockling occurs, which deteriorates image quality. Insufficient heating for drying ink droplets in an inkjet image forming apparatus may cause blocking of another recording medium stacked above. In contrast, excessive heating may cause blisters of air inside the recording medium. These symptoms cause deterioration of image quality and an abnormality in conveyance of the recording medium.

In heating in the process of image formation, temperature is preferably controlled depending on whether a sheet is conveyed. This is because the sheet is sometimes excessively heated due to continued heating when an erroneous detection occurs. In the erroneous detection, a sheet is detected to be being conveyed despite the fact that the sheet is stopped due to, for example, conveyance abnormality.

SUMMARY

In an aspect of the present disclosure, there is provided an image forming apparatus that includes a heater, a first temperature sensor, a second temperature sensor, and processing circuitry. The heater is configured to heat a medium on which an image is formed. The first temperature sensor is configured to measure a temperature of the heater. The second temperature sensor is configured to measure a temperature of a region heated by the heater. The processing circuitry is configured to control the temperature of the heater. The processing circuitry is configured to control the heater based on a comparison between a measured temperature of the first temperature sensor and a first threshold value, and a comparison between a measured temperature of the second temperature sensor and a second threshold value.

In another aspect of the present disclosure, there is provided a method of controlling a heater included in an image forming apparatus and configured to heat a medium on which an image is formed. The method includes measuring a temperature of the heater; measuring a temperature of a region heated by the heater; and controlling the heater based on a comparison of the measured temperature of the heater and a first threshold value, and a comparison of the measured temperature of the region and a second threshold value.

In still another aspect of the present disclosure, there is provided an image forming apparatus that includes a heater, a first temperature sensor, a second temperature sensor, and a processor. The heater heats a medium. The first temperature sensor measures a temperature of the heater. The second temperature sensor measures a temperature of a region heated by the heater. The processor controls the temperature of the heater. The processor operates the heater only when the temperature measured by the first temperature sensor is lower than a first threshold value and the temperature measured by the second temperature sensor is lower than a second threshold value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
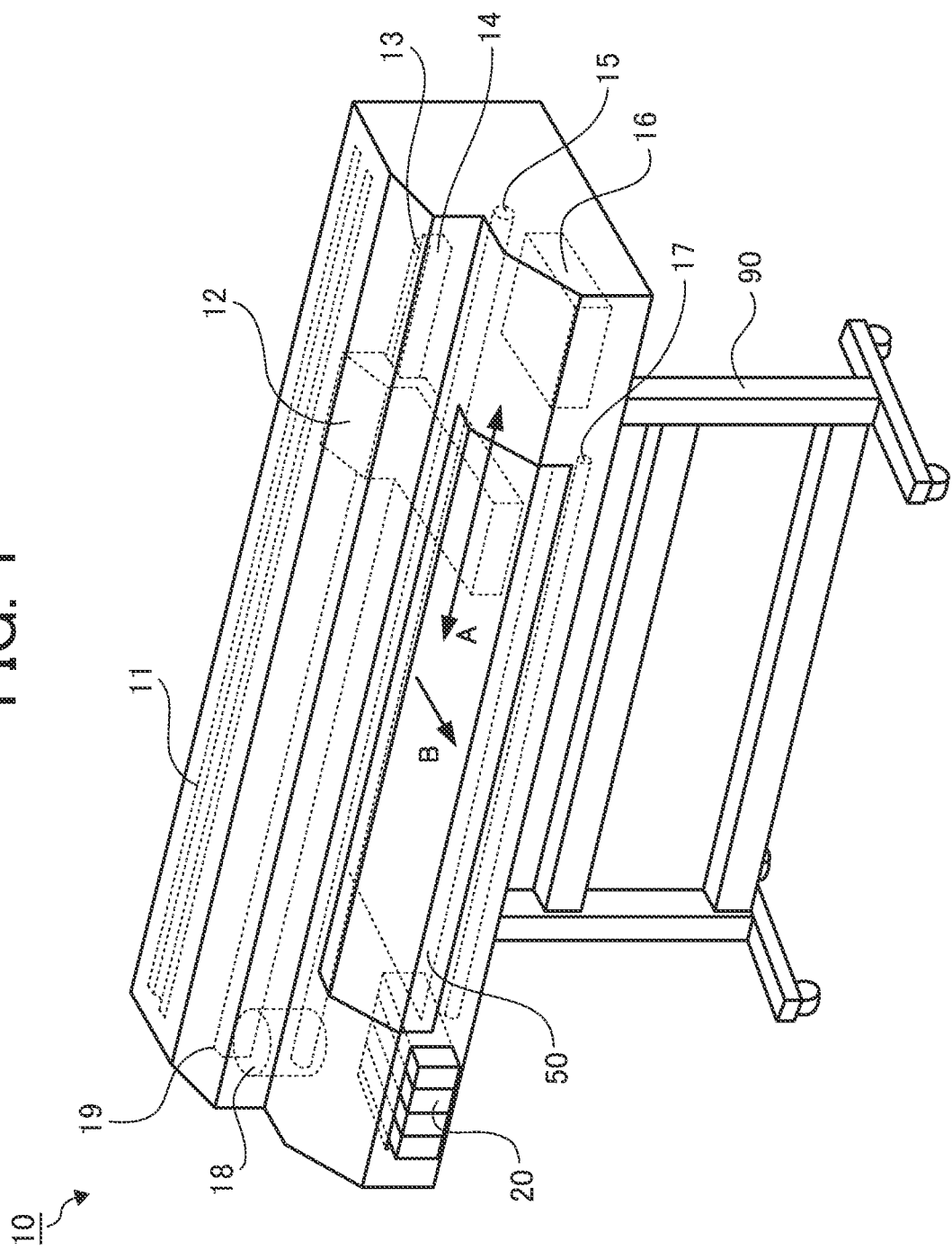
FIG. 1 illustrates a schematic configuration of an image forming apparatus in an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the invention will hereinafter be described with reference to embodiments, the invention is not limited to the later-described embodiments. In the drawings referred below, the same signs are used for the common elements, and the description thereof will be omitted as appropriate. Although, in the following description, an inkjet image forming apparatus, in which a sheet 50 is used as a recording medium, will be described as an example, the image forming apparatus does not limit the embodiments.

FIG. 1 illustrates a schematic configuration of an image forming apparatus 10 in an embodiment of the disclosure. The image forming apparatus 10 in FIG. 1 includes a main body supported by a frame 90. The image forming apparatus 10 includes a guide rod 15 and a sub-guide rod 11. The guide rod 15 and the sub-guide rod 11 are laid inside both side-plates of the main body. A drive pulley 19 and a pressurizing pulley 14 are disposed in a direction of the guide rods, and connected by a timing belt 13. The timing belt 13 is wound around the drive pulley 19 and the pressurizing pulley 14. The drive pulley 19 is rotated by a main scanning motor 18 to drive the timing belt 13. The pressurizing pulley 14 can apply tension to the timing belt 13, so that the timing belt 13 can be rotationally driven without slack.

The guide rod 15, the sub-guide rod 11, and the timing belt 13 hold a carriage 12. This configuration enables the carriage 12 to reciprocate in the direction of an arrow A in FIG. 1. The A direction will hereinafter be referred to as a "main-scanning direction". The carriage 12 includes a later-described recording head. The recording head includes a plurality of nozzles. The carriage 12 moves in the main-scanning direction. Ink is ejected from the nozzles. This operation enables an image to be formed on the sheet 50 conveyed in the direction of an arrow B. The B direction will hereinafter be referred to as a "sub-scanning direction".

Figure 2:
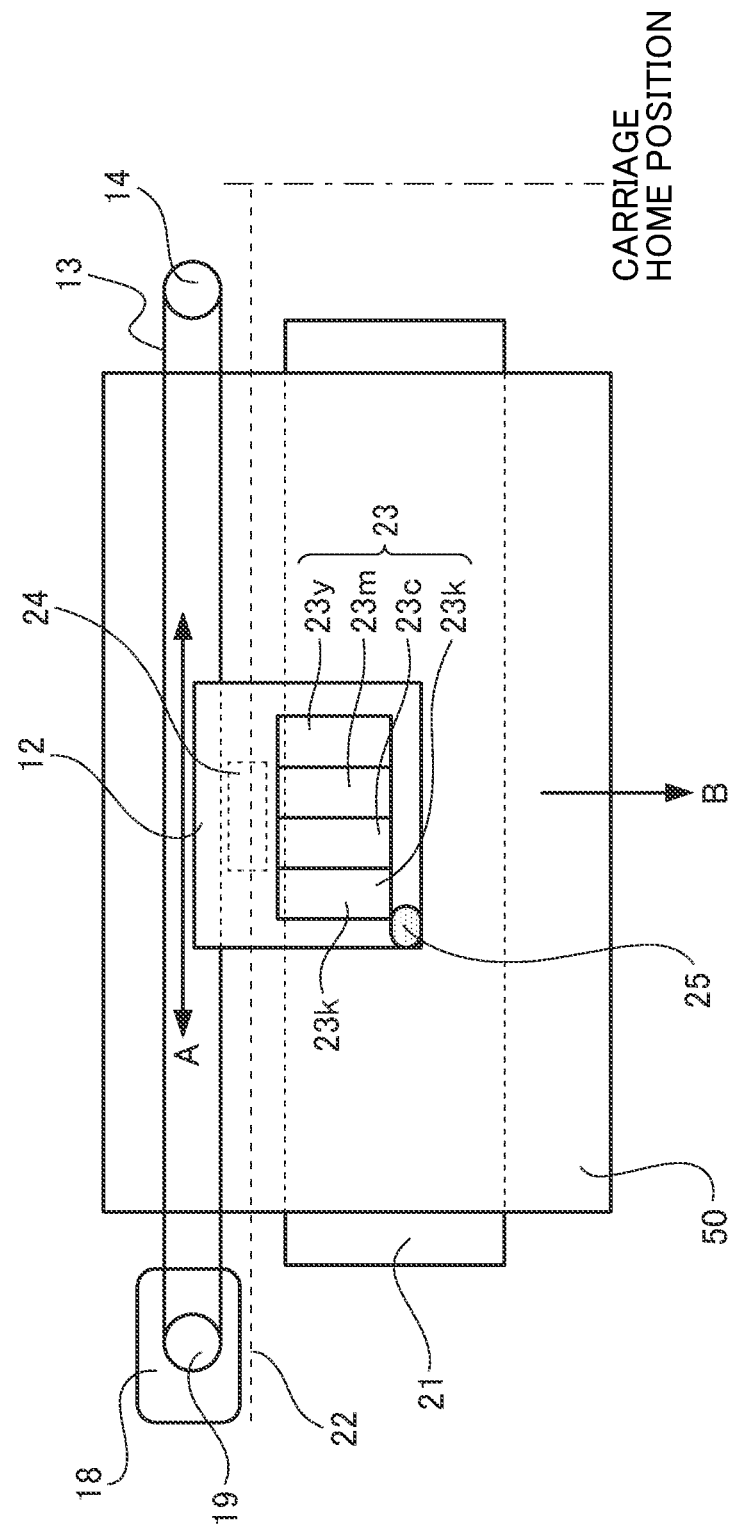
FIG. 2 is a schematic view illustrating a configuration of a carriage scanning assembly of the image forming apparatus in the embodiment.

The image forming apparatus 10 includes a cartridge 20 to supply ink to a recording head 23 (see FIG. 2). Ink is ejected to form an image on the sheet 50. The sheet 50 is heated by a heating device 17. Ink drying processing is performed in such a way. The heating device 17 may include a plurality of heaters, and may perform a heating process before or during ink ejection. The image forming apparatus 10 includes a maintenance assembly 16 for maintaining the plurality of nozzles equipped on the recording head 23. Periodic maintenance processing can inhibit the clog of the nozzles.

FIG. 2 is a schematic view illustrating the configuration of a carriage scanning assembly of the image forming apparatus 10 according to the present embodiment. The carriage 12 includes recording heads 23k, 23c, 23m, and 23y, a main-scanning encoder sensor 24, and an object sensor 25. The carriage 12 moves in the main-scanning direction while the sheet 50 is conveyed in the sub-scanning direction, whereby ink can be ejected at any position of the sheet 50. The recording heads 23k, 23c, 23m, and 23y include a nozzle for ejecting ink of black (K), cyan (C), magenta (M), and yellow (Y), respectively. Inks of these colors can be combined to form a color image.

The recording head 23 ejects inks of various colors from the nozzles to form a predetermined image. The inks are supplied from the cartridge 20. The main-scanning encoder sensor 24 moves in the main-scanning direction while reading an encoder sheet 22. This operation enables the carriage 12 to appropriately acquire the position of the carriage 12, and enables ink to be ejected to an appropriate position of the sheet 50.

A platen 21 is disposed so as to face the carriage 12, and supports the sheet 50 conveyed in the sub-scanning direction from below. The object sensor 25 mounted on the carriage 12 detects an object below the carriage 12. This detection enables identification of whether the carriage 12 is over an area outside the platen 21, an area of the platen 21, or an area of the sheet 50. Combination of detection information of the object sensor 25 and an encoder value of the main-scanning encoder sensor 24 enables calculation of the dimension of the sheet 50 in the main-scanning direction.

A carriage home position illustrated by a dashed-dotted line in FIG. 2 serves as a reference for the carriage 12 to move in the main-scanning direction. The carriage home position can be set at any position. For example, the carriage home position can be set above the maintenance assembly 16 (see FIG. 1).

Figure 3:
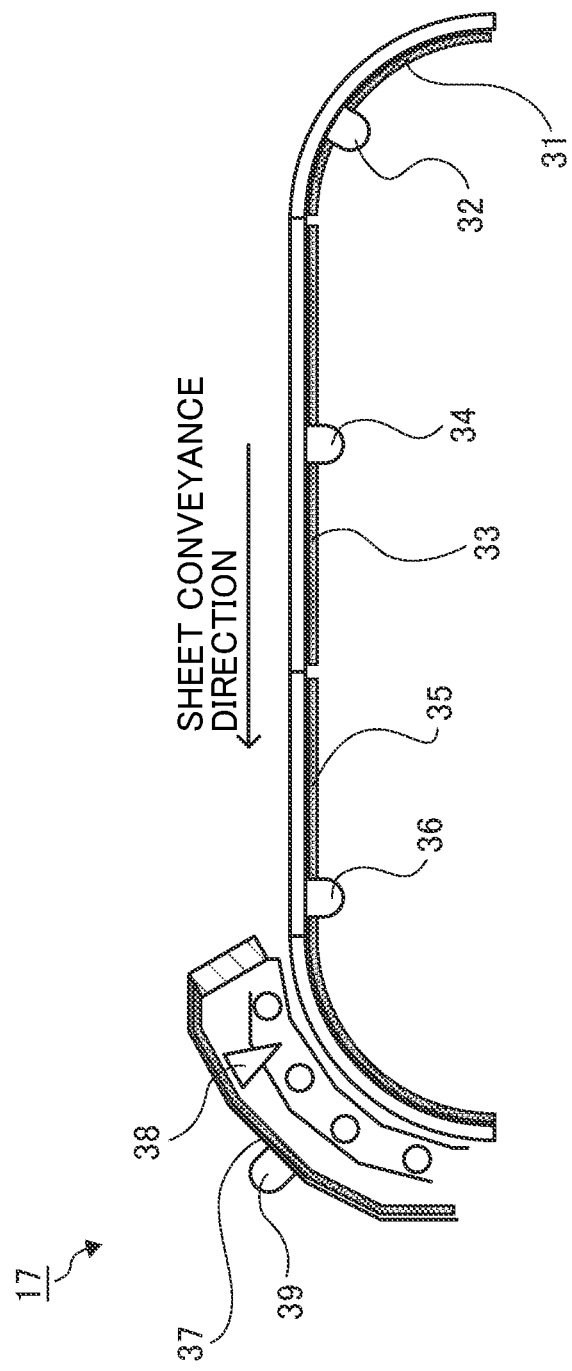
FIG. 3 is a cross-sectional view illustrating the configuration of a heating device in the embodiment.

FIG. 3 is a cross-sectional view illustrating the configuration of the heating device 17 in the present embodiment. The heating device 17 heats the sheet 50 by various methods to maintain the flatness of the sheet 50 in an image forming process and promote drying of ink after image formation. The heating device 17 preferably includes a plurality of heaters according to the effect of heating. As illustrated in FIG. 3, the heating device 17 in the present embodiment includes a pre-heater 31, a platen heater 33, a post-heater 35, and a curing heater 37, which are disposed along the sheet conveyance direction. The sheet conveyance direction corresponds to the sub-scanning direction.

The pre-heater 31 heats the sheet 50 before the image forming process. The pre-heater 31 preheats the sheet 50 to facilitate evaporation of the moisture of ink at the time when an ink droplet impacts on the sheet 50. This enables quick drying, thereby improving the quality of an image.

The platen heater 33 heats the platen 21 disposed below the flow line of the carriage 12. The platen heater 33 heats an impacted ink droplet together with the sheet 50 to form a film on the surface of the ink droplet. The film formed on the ink surface by heating enables an appropriate size of ink droplet, thereby inhibiting deterioration of the image quality.

The post-heater 35 further heats the conveyed sheet 50 on which an ink droplet has impacted. The post-heater 35 continues heating even after impact of ink to evaporate the moisture and solvent of the ink and promote drying.

The curing heater 37 heats the ink surface by far infrared rays from the inside of the ink. The curing heater 37 heats ink from the inside to cause polymerization reaction of ink resin. The polymerization reaction cures the ink, and fixes the ink on the sheet 50. The curing heater 37 is housed in a lamp house that shields and reflects far infrared rays for efficient heating. The lamp house can reflect far infrared rays having been emitted toward the opposite side of the ink to be dried to the ink side, thereby enabling the efficient heating. The lamp house in the present embodiment includes a lamp house temperature sensor 39 in order to prevent excessive heating of the curing heater 37.

A pre-heater temperature sensor 32, a platen heater temperature sensor 34, a post-heater temperature sensor 36, a curing heater temperature sensor 38, and the lamp house temperature sensor 39 are provided near each of the above-described heaters 31, 33, 35, and 37. The temperature sensors 32, 34, 36, 38, and 39 measure the temperature of the conveyance surface or the sheet 50. Each heater is controlled to a predetermined temperature based on temperature data measured by each temperature sensor. In the example in FIG. 3, thermistors are used as the pre-heater temperature sensor 32, the platen heater temperature sensor 34, and the post-heater temperature sensor 36. The thermistors are attached on the conveyance surface to measure the temperature of the conveyance surface. For example, a noncontact thermopile can be used as the curing heater temperature sensor 38 to measure the temperature of the conveyed sheet 50. The lamp house temperature sensor 39 is attached on the lamp house to measure the temperature state of the curing heater 37.

Figure 4:
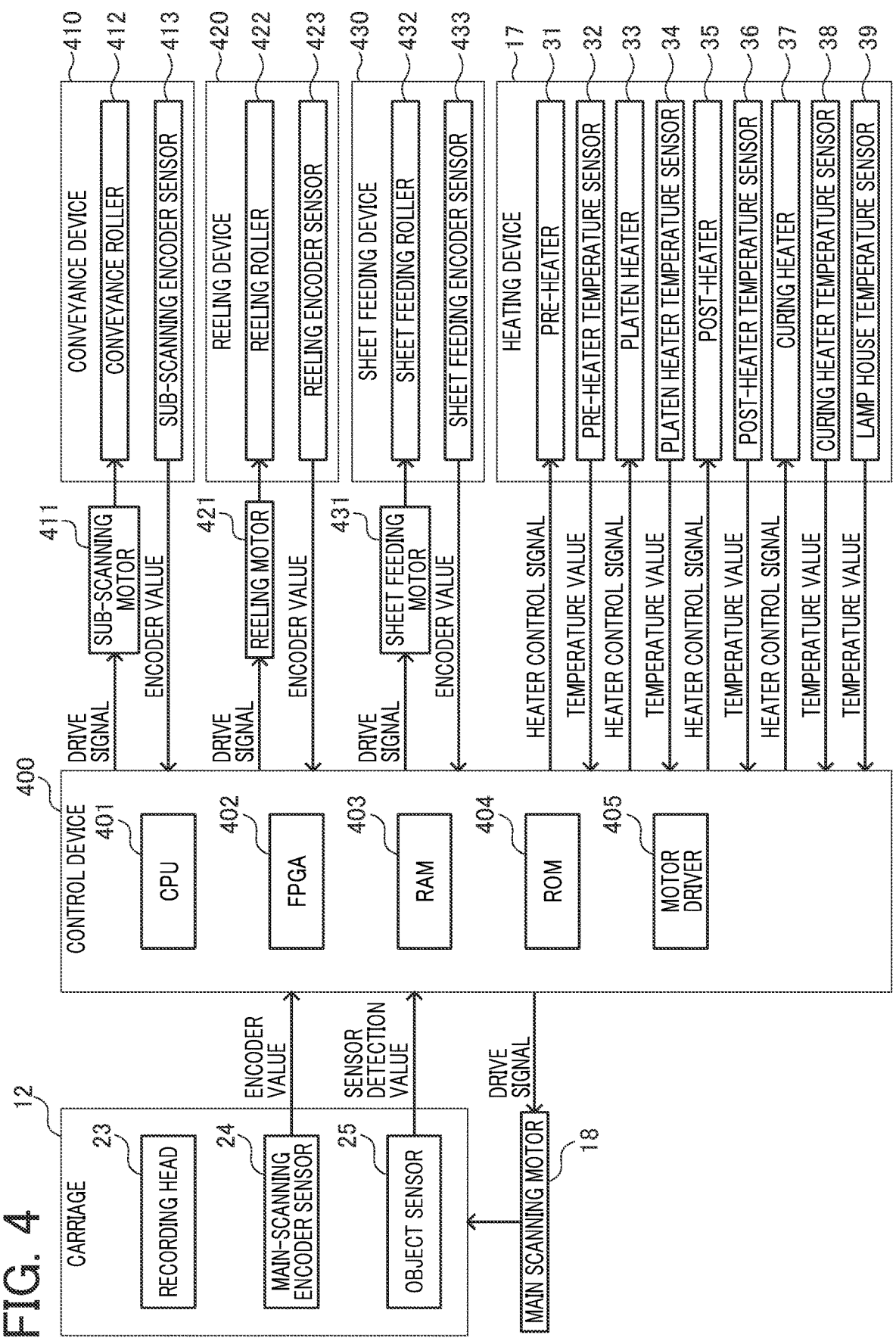
FIG. 4 illustrates the hardware configuration of the image forming apparatus in the embodiment.

The hardware configuration of the image forming apparatus 10 will now be described. FIG. 4 illustrates a hardware configuration of the image forming apparatus 10 in the present embodiment. As illustrated in FIG. 4, the image forming apparatus 10 according to the present embodiment includes a control device 400, a conveyance device 410, a reeling device 420, and a sheet feeding device 430 in addition to the carriage 12, the main scanning motor 18, and the heating device 17 illustrated in FIGS. 1 to 3.

The control device 400 controls the operation of the image forming apparatus 10. The control device 400 receives signals from various pieces of hardware, and outputs control signals. The control device 400 as control circuitry includes a central processing unit (CPU) 401, a field programmable gate array (FPGA) 402, a random-access memory (RAM) 403, a read-only memory (ROM) 404, and a motor driver 405.

The CPU 401 executes a program for controlling the operation of the image forming apparatus 10, and performs predetermined processing. The FPGA 402 is an integrated circuit for image processing. The FPGA 402 has a configuration specialized for a specific application so as to perform high-speed processing compared to the CPU 401.

The RAM 403 is a volatile memory device for providing execution space for the CPU 401 and the FPGA 402 to execute programs. The RAM 403 is used for storing and decompressing programs and data. The ROM 404 is a non-volatile memory device for storing, for example, programs to be executed by the CPU 401 and the FPGA 402, and firmware.

The motor driver 405 controls various motors in the image forming apparatus 10. The motor driver 405 outputs drive signals calculated by the CPU 401 and the FPGA 402 to various motors.

The main scanning motor 18, which has received a drive control signal from the control device 400, reciprocates the carriage 12 in the main-scanning direction. Along with a movement of the carriage 12, the main-scanning encoder sensor 24 reads the encoder sheet 22, and outputs the encoder value to the control device 400. The object sensor 25 in the carriage 12 detects whether the platen 21 is placed at a position facing the carriage 12 and whether the sheet 50 is placed, and outputs the detection result to the control device 400. The control device 400 controls image forming processing based on the encoder value and the sensor detection value.

A sub-scanning motor 411, which has received the control signal from the control device 400, controls the operation of a conveyance roller 412. The control causes the conveyance device 410 to convey the sheet 50 on the conveyance surface in the sub-scanning direction. The conveyance device 410 includes a sub-scanning encoder sensor 413. The conveyance device 410 acquires a movement amount of the sheet 50 in the sub-scanning direction, and outputs the movement amount as an encoder value to the control device 400.

The reeling device 420 can optionally change a print start position after drying the sheet 50. For example, the reeling device 420 can reel the sheet 50 to adjust the print start position to a rear end position of the image that has already formed. In the reeling device 420, the reeling motor 421, which has received a control signal from the control device 400, controls the operation of a reeling roller 422. The reeling device 420 includes a reeling encoder sensor 423. The reeling device 420 outputs an encoder value to the control device 400.

A sheet feeding motor 431, which has received the control signal from the control device 400, controls the operation of a sheet feeding roller 432. The control causes the sheet feeding device 430 to convey the sheet 50 from the sheet feeding tray to the conveyance surface. The sheet feeding device 430 includes a sheet feeding encoder sensor 433. The sheet feeding device 430 outputs the movement amount of the sheet 50 as an encoder value to the control device 400.

As illustrated in FIG. 3, the heating device 17 includes the pre-heater 31, the pre-heater temperature sensor 32, the platen heater 33, the platen heater temperature sensor 34, the post-heater 35, the post-heater temperature sensor 36, the curing heater 37, the curing heater temperature sensor 38, and the lamp house temperature sensor 39. Various heaters are arranged in the sub-scanning direction, and controlled in temperature by receiving a heater control signal from the control device 400. Each of the temperature sensors is disposed in the vicinity of each heater. Each temperature sensor measures the temperature of the conveyance surface or the sheet 50 that is heated by each heater, and feeds back the temperature value to the control device 400. This enables temperature control based on the temperature data measured by various heaters, so that the sheet 50 can have an appropriate temperature.

Figure 5:
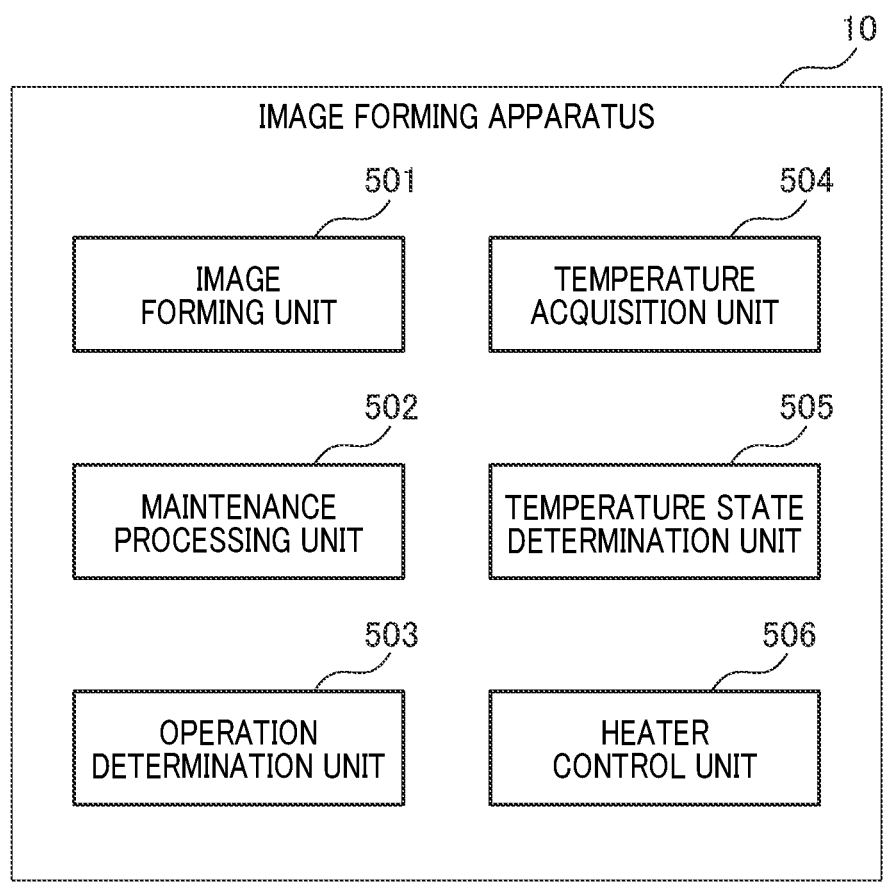
FIG. 5 is a block diagram of software in the image forming apparatus in the embodiment.

The hardware configuration of the image forming apparatus 10 according to the present embodiment has been described above. A functional device implemented by each hardware of the present embodiment will now be described with reference to FIG. 5. FIG. 5 is a block diagram of software in the image forming apparatus 10 of the present embodiment.

The image forming apparatus 10 includes modules of an image forming unit 501, a maintenance processing unit 502, an operation determination unit 503, a temperature acquisition unit 504, a temperature state determination unit 505, and a heater control unit 506. Details of each functional device will be described below.

The image forming unit 501 controls the operations of, for example, the carriage 12 and the conveyance device 410 based on a print job input from, for example, a personal computer terminal, and forms an image on the surface of the sheet 50.

The maintenance processing unit 502 controls the operation of the maintenance assembly 16. The maintenance processing unit 502 cleans an ink ejecting nozzle that constitutes the carriage 12, so that the clog of the nozzle can be inhibited. The maintenance processing can be performed during the execution of the print job, and in this case, the conveyance of the sheet 50 is interrupted.

The operation determination unit 503 determines the operation state of the image forming apparatus 10. The operation determination unit 503 determines whether conveyance is in progress, that is, whether printing is in progress based on the operation states of the image forming unit 501 and the maintenance processing unit 502. "Intermittent operation" can be performed in controlling the conveyance in an image forming process. In the intermittent operation, the conveyance is suspended while the carriage 12 moves on the sheet 50 in the main-scanning direction. The carriage 12 forms a line of image, and the sheet 50 is conveyed in the sub-scanning direction by one line.

The temperature acquisition unit 504 controls each of the temperature sensors 32, 34, 36, 38, and 39, and acquires temperature values of, for example, the conveyance surface, the sheet 50, and the lamp house.

The temperature state determination unit 505 determines whether the temperature state is appropriate based on the temperature information of each part acquired by the temperature acquisition unit 504. The temperature state determination unit 505 compares the temperature value to a preset threshold value to determine the temperature state.

The heater control unit 506 outputs a signal for controlling each of the heaters 31, 33, 35, and 37 to control the temperature of the heaters. The heater control unit 506 switches on/off of various heaters based on the determination result from the temperature state determination unit 505 to set the temperatures of the heaters to desired temperatures.

The above-described software blocks correspond to the functional devices implemented by the CPU 401 and the FPGA 402 executing a program of the present embodiment and causing each hardware to function. All the functional devices illustrated in each embodiment may be implemented in software, or part or all of the functional devices may be mounted as hardware that provides equivalent functions.

Figure 6:
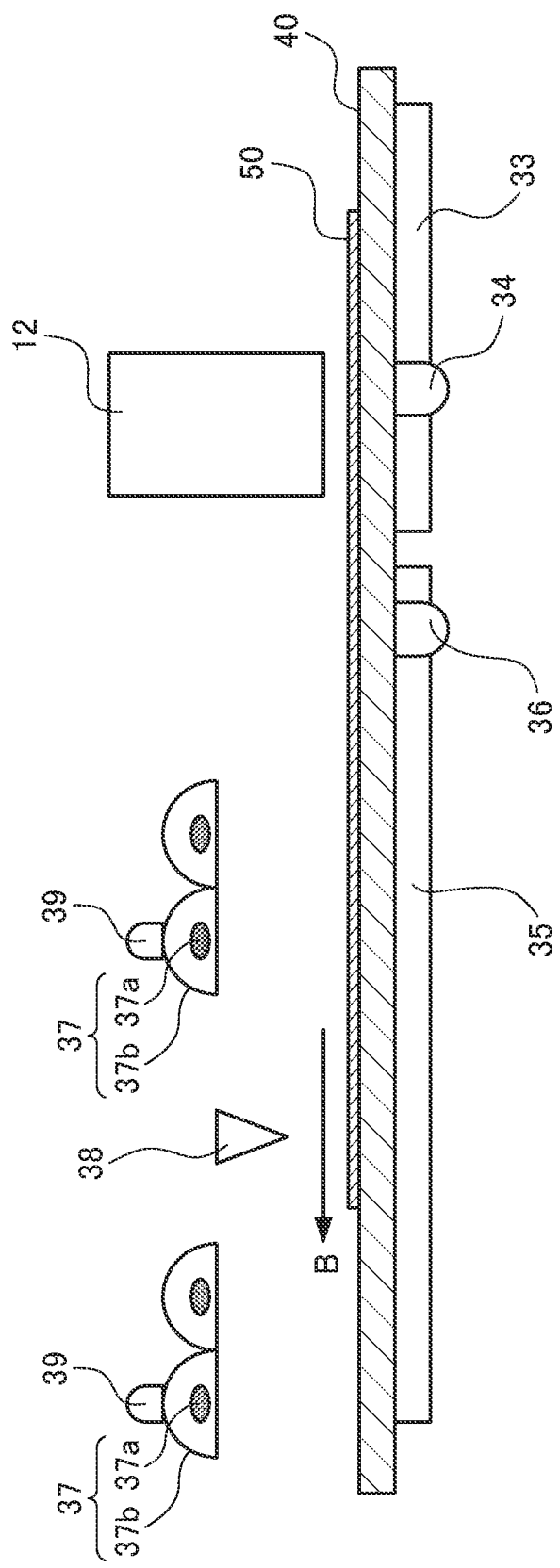
FIG. 6 is a cross-sectional view illustrating the arrangement of various heaters and sensors in the image forming apparatus in the embodiment.

FIG. 6 is a cross-sectional view illustrating the arrangement of various heaters and sensors in the image forming apparatus 10 of the present embodiment. The cross-sectional view in FIG. 6 is obtained by simplifying a part of the cross-sectional view in FIG. 3, and illustrates the structure of the curing heater 37 in detail. Description of the content that has already described in FIG. 3 will hereinafter be omitted as appropriate, and FIG. 6 will be described.

As illustrated in FIG. 6, the sheet 50 is conveyed in the sub-scanning direction (B direction) by intermittent operations of a conveyor 40. An image is formed on the surface of the sheet 50 by ink ejected from a nozzle. The sheet 50 has been heated by the platen heater 33. Further intermittent operations advance the conveyance. The post-heater 35 and the curing heater 37 heat the sheet 50 to dry ink.

The curing heater 37 includes an infrared ray (IR) lamp 37a and a lamp house 37b. The IR lamp 37a radiates infrared rays. The lamp house 37b shields and reflects infrared rays in a specific direction for efficient heating. When the IR lamp 37a irradiates a region with light, the irradiated region is heated by thermal energy. In the present embodiment, the sheet 50 on the conveyor 40 is heated to dry ink that has impacted on the surface of the sheet 50.

The image forming apparatus 10 of the present embodiment may include a plurality of curing heaters 37. For example, as illustrated in FIG. 6, a plurality of curing heaters 37 may be arranged in the sub-scanning direction. The sheet 50 having ink that has impacted on the surface is first heated by a first curing heater 37, further conveyed in the sub-scanning direction, and heated by a second curing heater 37. The curing heater 37 on the side of the carriage 12 will be referred to as an "upstream curing heater 37". The curing heater 37 in the direction of convenience of the sheet 50 will be referred to as an "downstream curing heater 37". These curing heaters 37 are distinguished for convenience.

As described above, the image forming apparatus 10 includes various temperature sensors for setting the sheet 50 to an appropriate temperature. For example, the platen heater temperature sensor 34 and the post-heater temperature sensor 36 acquire the temperature of each heater to perform feedback control. The curing heater temperature sensor 38 is of noncontact type. In particular, when the curing heater temperature sensor 38 is a thermopile that measures a temperature by infrared rays, emission light of the IR lamp 37a has influence on a measurement value. The curing heater temperature sensor 38 is thus preferably disposed at a position where the emission light of the IR lamp 37a is shielded. In the present embodiment, as illustrated in FIG. 6, the curing heater temperature sensor 38 is disposed between a plurality of curing heaters 37, and measures the temperature of the conveyed sheet 50.

The lamp house 37b of the curing heater 37 includes the lamp house temperature sensor 39 for controlling an excessive temperature of the IR lamp 37a. The lamp house temperature sensor 39 measures the temperature of the lamp house 37b to determine whether the IR lamp 37a is properly operating. In this case, when the temperature of the lamp house 37b is equal to or greater than a predetermined temperature, the IR lamp 37a is determined to abnormally operate, and the operation of the image forming apparatus 10 is urgently stopped. This enables the entire apparatus to operate safely.

Figure 7:
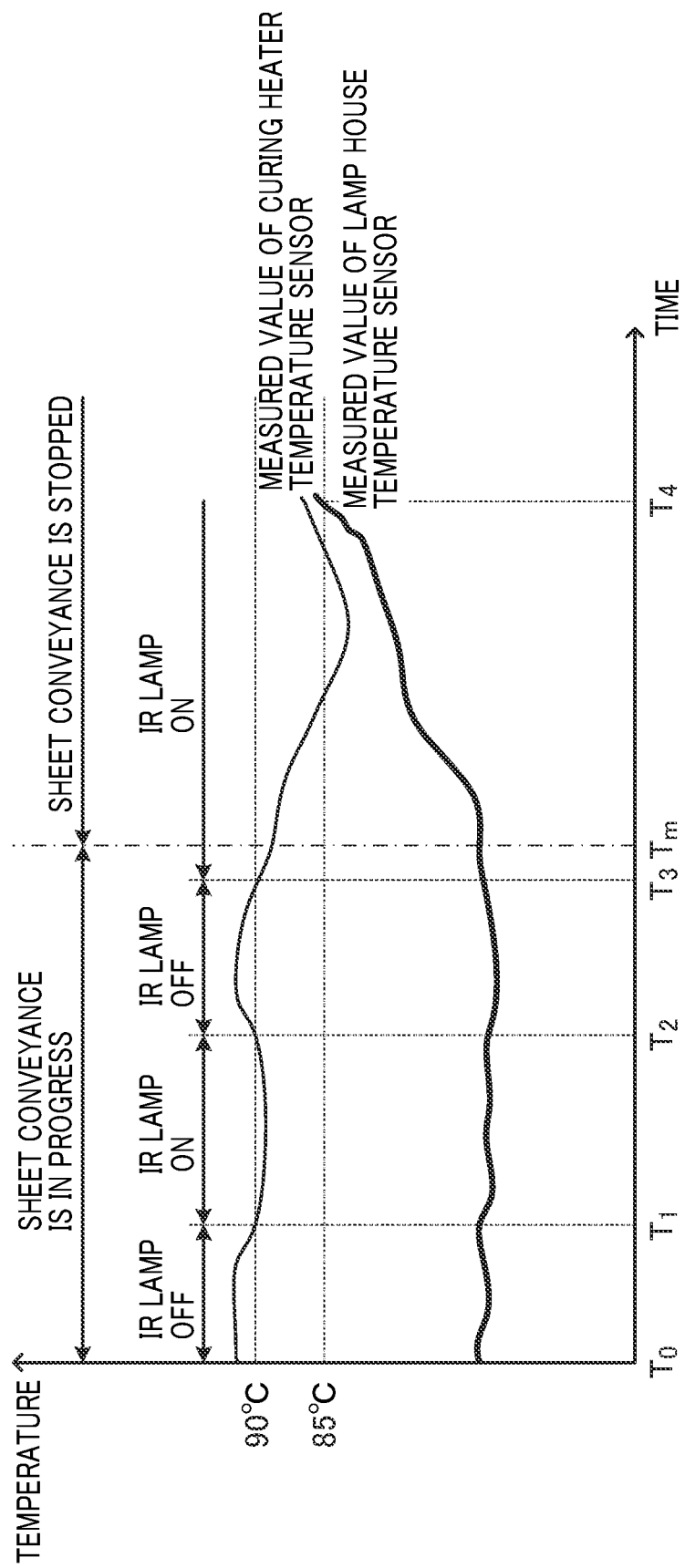
FIG. 7 illustrates an example of temperature detection under control according to a comparative example.

When maintenance processing is performed during the execution of a print job, the lamp house temperature sensor 39 detects high temperatures, and the apparatus is sometimes abnormally stopped in a comparative example. FIG. 7 illustrates temperature detection under control according to a comparative example.

In the example in FIG. 7, the image forming apparatus 10 performs printing on the sheet 50 from time $T_0$ to time $T_m$. The image forming apparatus 10 conveys the sheet 50 by intermittent operation. After time $T_m$, the image forming apparatus 10 suspends printing on the sheet 50 and conveyance of the sheet 50 to perform maintenance processing. FIG. 7 illustrates fluctuations in a measurement value of the temperature sensor of each part in such a case. The thick line illustrates measurement values of the lamp house temperature sensor 39. The thin line illustrates measurement values of the curing heater temperature sensor 38.

In the control in the comparative example in FIG. 7, when the measurement value of the curing heater temperature sensor exceeds 90° C., the image forming apparatus 10 turns off output of the IR lamp 37a, and when the measurement value of the curing heater temperature sensor is equal to or less than 90° C., the image forming apparatus 10 turns on the output of the IR lamp 37a. Such control enables heating of the sheet 50 to an appropriate temperature and improvement of quality of a formed image.

As described above, when the IR lamp 37a of the curing heater 37 continues the output for a long time, the curing heater 37 is excessively heated. This leads to a failure of the image forming apparatus 10. In the example in FIG. 7, when the measurement value of the lamp house temperature is equal to or greater than 85° C., abnormally high temperature is determined to be measured, and the image forming apparatus 10 is stopped to protect the apparatus.

In FIG. 7, the measurement value of the curing heater temperature sensor 38 exceeds 90° C. from time $T_0$ to time $T_1$, and thus the output of the IR lamp 37a is turned off. When the off-state of the IR lamp 37a continues as from time $T_0$ to time $T_1$, the temperature of the region detected by the curing heater temperature sensor 38 decreases, and the measurement value is equal to or less than 90° C. at time $T_1$. The output of the IR lamp 37a is turned on at time $T_1$.

When the output of the IR lamp 37a is turned on at time $T_1$, the conveyed sheet 50 is heated, and the measurement value of the curing heater temperature sensor 38 is also increased. Since a time lag occurs for the measurement value that has been equal to or less than 90° C. to be again heated to exceed 90° C., the on-state of the output of the IR lamp 37a continues until time $T_2$. The measurement value of the curing heater temperature sensor 38 exceeds 90° C. at time $T_2$, and thus the output of the IR lamp 37a is turned off again.

As in the case from time $T_0$ to time $T_1$, the off-state of the output of the IR lamp 37a continues from time $T_2$ to time $T_3$. The turning-off of the output of the IR lamp 37a decreases the temperature of the region detected by the curing heater temperature sensor 38. The measurement value is equal to or less than 90° C. at time $T_3$, and the output of the IR lamp 37a is again turned on at time $T_3$.

Maintenance processing performed by the image forming apparatus 10 at time $T_m$ after time $T_3$ will now be considered. When the image forming apparatus 10 enters a maintenance mode during print job execution, the image forming apparatus 10 suspends conveying the sheet 50. That is, the sheet 50 that has been heated by the upstream curing heater 37 in FIG. 6 is not conveyed to the detection region of the curing heater temperature sensor 38. The same part of the sheet 50 is stopped in the detection region of the curing heater temperature sensor 38. The part is not heated by the curing heater 37 after passing through the upstream curing heater 37. The temperature of the part is thus decreased. As illustrated in FIG. 7, the measurement value of the curing heater temperature sensor 38 gradually decreases even after time $T_m$. After time $T_m$, the IR lamp 37a is in the on-state.

When maintenance processing stops conveying the sheet 50, the IR lamp 37a continues heating the same part. Heat is accumulated in the detection region of the lamp house temperature sensor 39. As illustrated in FIG. 7, the measurement value of the lamp house temperature sensor 39 is increased. When the temperature continues to increase, the temperature exceeds 85° C. at time $T_4$. The temperature is determined to be abnormally high, and the image forming apparatus 10 is stopped. When the image forming apparatus 10 is stopped by the abnormally high temperature in such a way, the recovery thereof consumes time, which is not preferable in operation.

Figure 8:
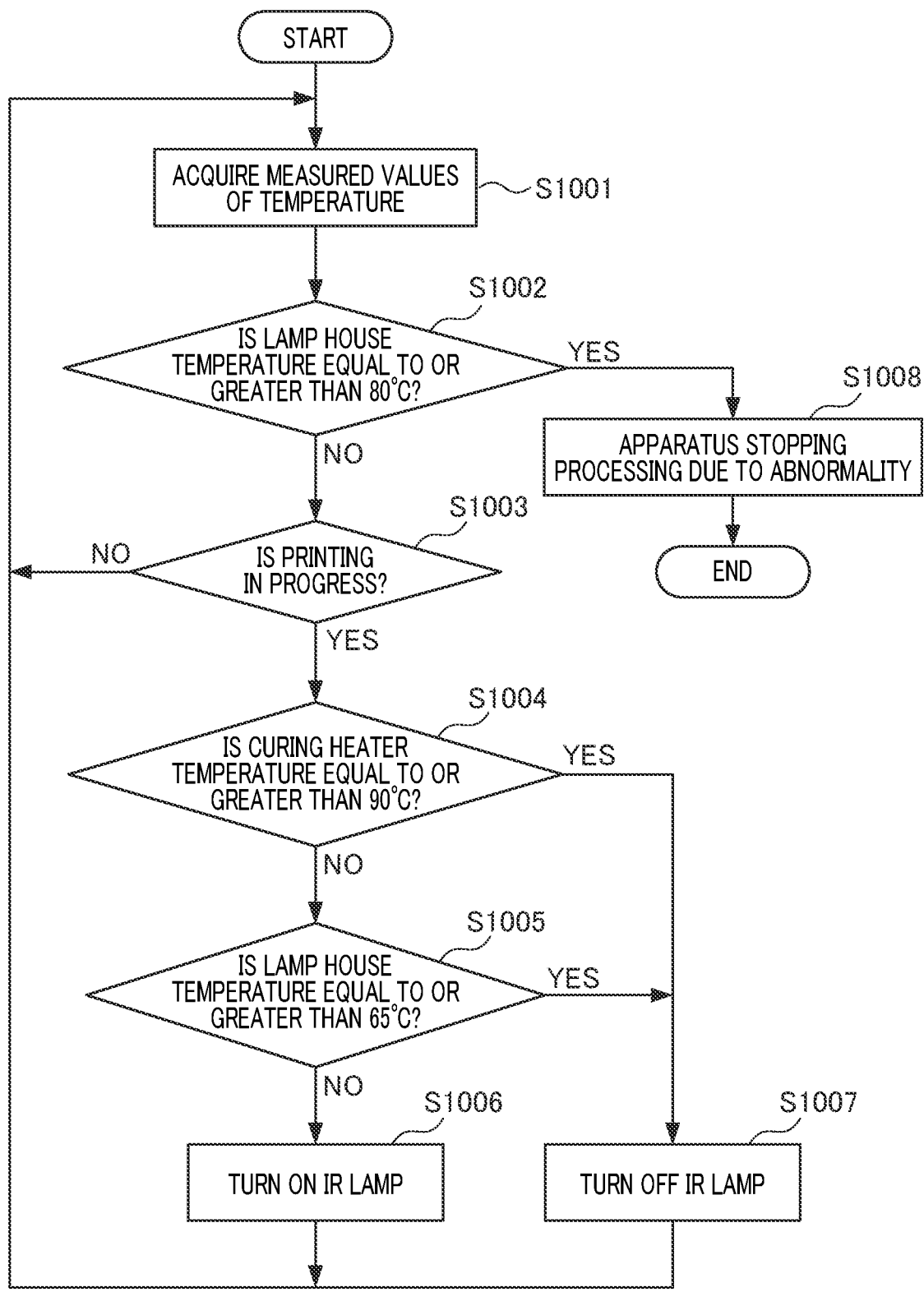
FIG. 8 is a flowchart illustrating temperature control processing performed by the image forming apparatus in the embodiment.

In the present embodiment, the stop of the apparatus due to detection of abnormally high temperature is inhibited by appropriately controlling the operation of the IR lamp 37a even when conveyance of the sheet 50 is suspended. FIG. 8 is a flowchart illustrating temperature control processing performed by the image forming apparatus 10 of the present embodiment.

The image forming apparatus 10 starts the processing from step S1000. In step S1001, the temperature acquisition unit 504 acquires measurement values of temperatures from each of the temperature sensors.

In step S1002, the temperature state determination unit 505 determines whether a lamp house temperature is equal to or greater than a predetermined value based on the measurement value acquired by the temperature acquisition unit 504, and the processing is branched. Here, as an example of the predetermined temperature, an example, in which the processing is branched depending on whether the temperature is equal to or greater than 80° C. to safely protect the apparatus, is illustrated. When the lamp house temperature is equal to or greater than 80° C. (YES), the processing proceeds to step S1008, and the apparatus is stopped as being in abnormally high temperature state. At this time, the fact that the apparatus is in abnormally high temperature state can be indicated by, for example, an alarm. The processing ends in step S1009.

When the lamp house temperature is less than 80° C. in step S1002 (NO), the processing proceeds to step S1003. In step S1003, the operation determination unit 503 determines whether printing is in progress based on the operation states of the image forming unit 501 and the maintenance processing unit 502. For example, when the image forming unit 501 drives, for example, the carriage 12 to perform conveyance processing by intermittent operation, the operation determination unit 503 determines that the printing is in progress.

When the printing is determined to be not in progress in step S1003 (NO), the processing returns to step S1001, and the temperature acquisition unit 504 again acquires measurement values of temperatures from each sensor. Examples in which printing is not in progress include a case where the image forming apparatus 10 is in a standby mode. The progressing returns to step S1001 when the printing is not in progress. The image forming apparatus 10 can thus constantly monitor temperature abnormality of the IR lamp 37a.

When the printing is determined to be in progress (YES) in step S1003, the processing proceeds to step S1004. In step S1004, the temperature state determination unit 505 determines whether a temperature measurement value acquired by the curing heater temperature sensor 38 is equal to or greater than a predetermined temperature, and the processing is branched. The predetermined temperature in step S1004 can be set to a temperature at which the sheet 50 is appropriately heated, and can be set to 90° C. in one example.

When the measurement value of the curing heater temperature sensor 38 is equal to or greater than 90° C. in step S1004 (YES), the processing proceeds to step S1007. In step S1007, the heater control unit 506 turns off the output of the IR lamp 37a to inhibit heating.

When the measurement value of the curing heater temperature sensor 38 is less than 90° C. in step S1004 (NO), the processing proceeds to step S1005. In step S1005, the temperature state determination unit 505 determines whether a measurement value of the lamp house temperature is equal to or greater than a predetermined temperature, and the processing is branched. In one example, the predetermined temperature of the lamp house can be set to 65° C. to prevent excessive heating of the IR lamp 37a.

When the temperature measurement value of the lamp house is equal to or greater than 65° C. in step S1005 (YES), the processing proceeds to step S1007. The heater control unit 506 turns off the output of the IR lamp 37a. When the temperature measurement value of the lamp house is less than 65° C. in step S1005 (NO), the processing proceeds to step S1006. In step S1006, the heater control unit 506 turns on the output of the IR lamp 37a.

After performing the processing of steps S1006 and S1007, the image forming apparatus 10 returns to step S1001, and repeats the above-described processing. As described above, the processing in FIG. 8 enables the image forming apparatus 10 to appropriately control the operation of the IR lamp 37a, and the stop of the apparatus due to abnormally high temperature can be prevented.

Figure 9:
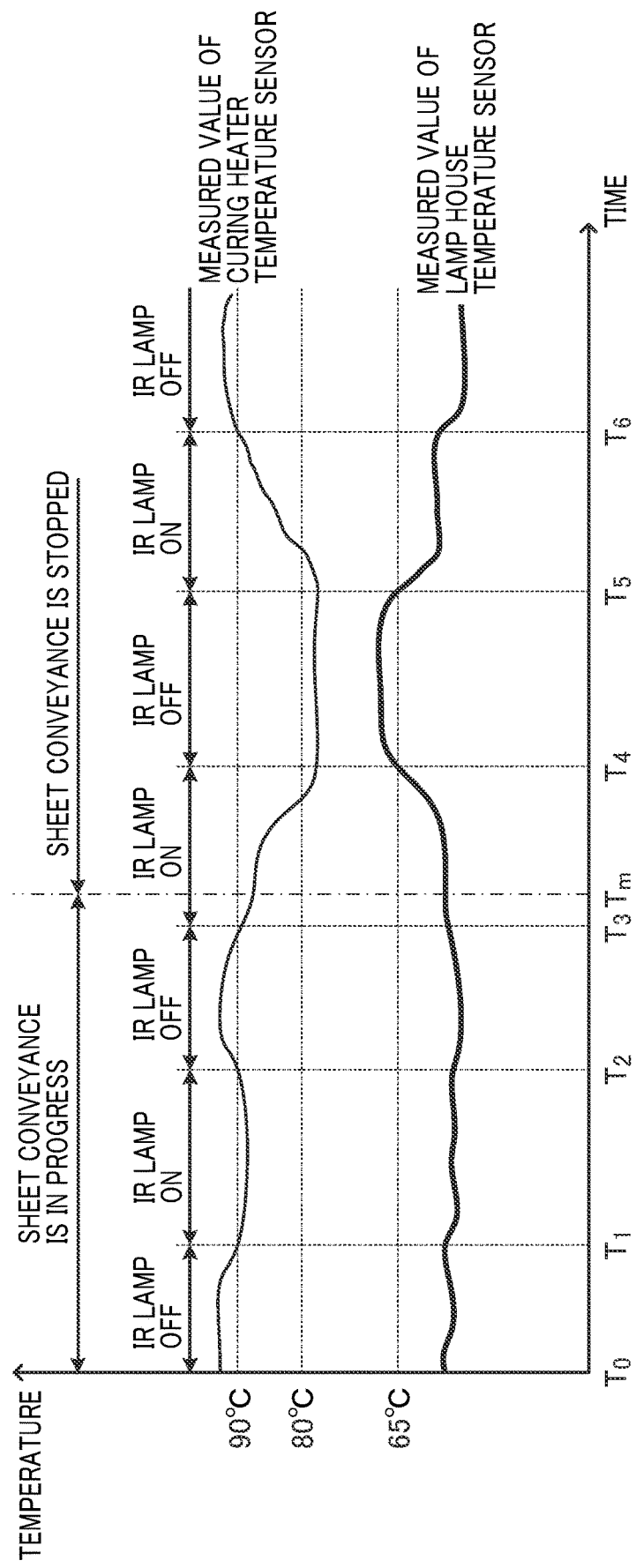
FIG. 9 illustrates an example of temperature detection under control in the embodiment.

An example of the temperature detection in the processing in FIG. 8 will now be described. FIG. 9 illustrates an example of temperature detection under control of the present embodiment. The temperature detection in FIG. 9 will be described with reference to the flowchart of FIG. 8 as appropriate below. The example in FIG. 9 is similar to that of temperature detection in the comparative example in FIG. 7 until time $T_m$, and thus detailed descriptions will be omitted.

In FIG. 9, the conveyance of the sheet 50 has been suspended along with the execution of maintenance processing since time $T_m$. In contrast, the operation state of the image forming apparatus 10 is in printing (step S1003: YES). The image forming apparatus 10 controls output of the IR lamp 37a based on temperature measurement values of the curing heater temperature sensor 38 and the lamp house temperature sensor 39 (steps S1004 and S1005). In FIG. 9, the measurement value of the lamp house temperature is less than 65° C. from time $T_m$ to time $T_4$ (step S1005: YES), the output of the IR lamp 37a is turned on (step S1006).

The lamp house temperature is then equal to or greater than 65° C. at time $T_4$ (step S1005: YES), and thus the output of the IR lamp 37a is turned off (step S1007). The off-state of the IR lamp 37a is then continued until time $T_5$, at which the lamp house temperature is equal to or greater than 65° C. The lamp house temperature is less than 65° C. at time $T_5$ (step S1005: NO), and thus the output of the IR lamp 37a is turned on (step S1006) to perform heating.

The output of the IR lamp 37a is turned on, and the measurement value of the curing heater temperature sensor 38 is equal to or greater than 90° C. at time $T_6$ (step S1004: YES). The output of the IR lamp 37a is turned off (step S1007).

Figure 10:
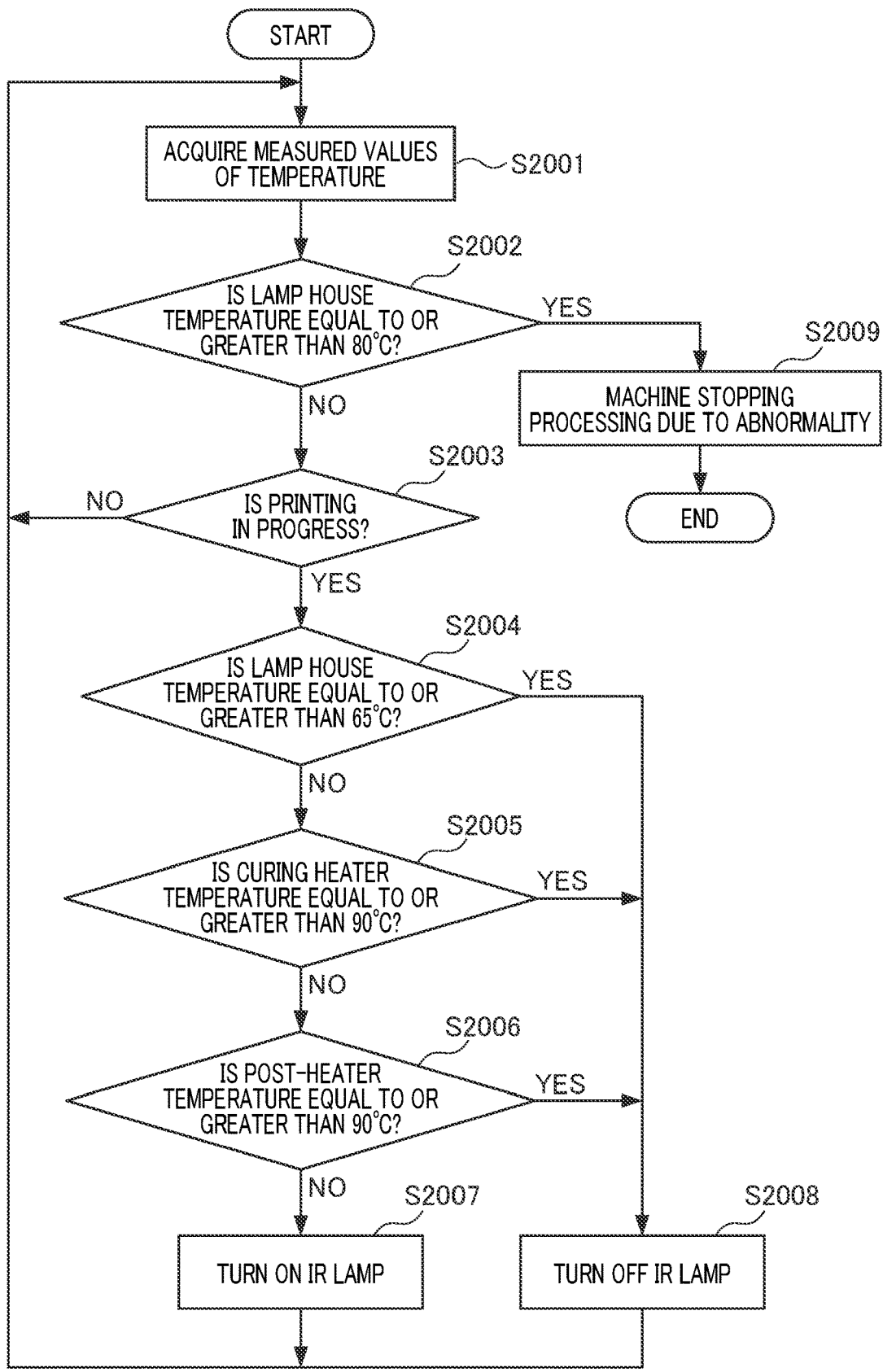
FIG. 10 is a flowchart illustrating temperature control processing performed by the image forming apparatus according to another embodiment of the present disclosure.

As described above, even during the execution of the maintenance processing, abnormally high temperature as illustrated in FIG. 7 can be prevented by appropriately selecting the determination of the temperature control. Although, in the example of FIGS. 8 and 9, the temperature control based on the temperature measurement values of the curing heater and the lamp house has been described, the temperature control may be performed based on other measurement values. For example, the post-heater temperature sensor 36, which is disposed near the curing heater 37, may be affected by heating of the IR lamp 37a. In another embodiment, the control may be performed based on a measurement value of the post-heater temperature sensor 36. FIG. 10 is a flowchart illustrating temperature control processing performed by the image forming apparatus 10 according to another embodiment. In the following description in the flowchart of FIG. 10, the processing common to that in FIG. 8 is as described above, and the detailed description will be omitted as appropriate.

Steps S2000 to S2005 are similar to the processing of steps S1000 to S1005. When the curing heater temperature is determined to be less than 90° C. in step S2005 (YES), that is, when both of the lamp house temperature and the curing heater temperature are less than predetermined values, the processing proceeds to step S2006.

In step S2006, the processing is branched depending on whether the post-heater temperature is equal to or greater than a predetermined threshold value. For example, when the predetermined threshold value is set to 90° C., the temperature state determination unit 505 determines whether the post-heater temperature is equal to or greater than 90° C. When the post-heater temperature is equal to or greater than 90° C. (YES), the processing proceeds to step S2008, and the output of the IR lamp 37a is turned off.

In contrast, when the temperature state determination unit 505 determines that the post-heater temperature is less than 90° C. in step S2006 (NO), the processing proceeds to step S2007, and the output of the IR lamp 37a is turned on. The processing of steps S2007 and S2008 is similar to that of steps S1006 and S1007.

The processing in FIG. 10 enables more appropriate temperature control of the image forming apparatus 10, prevention of abnormally high temperature state, and improvement of quality of a formed image.

The predetermined temperature, which is set in the above-described embodiment and serves as a determination reference of the temperature control, is not limited to those described above, and can be set to any value. The way of heat transfer and how the sheet 50 receives damage due to heat differ depending of the type of the sheet 50, and thus the predetermined temperature may be changed according to the type of the sheet 50.

According to the above-described embodiments of the disclosure, an image forming apparatus, a method, and a program that are capable of appropriately controlling temperature according to operations even when a printing operation is interrupted can be provided.

Each of the above-described functions of the embodiments of the disclosure can be implemented by a device-executable program written in, for example, C, C++, C#, and Java (registered trademark). The program of the embodiments can be stored in a device-readable recording medium to be distributed. Examples of the recording medium include a hard disk drive, a compact disk read only memory (CD-ROM), a magnetooptic disk (MO), a digital versatile disk (DVD), a flexible disk, an electrically erasable programmable read-only memory (EEPROM), and an erasable programmable read-only memory (EPROM). The program can be transmitted over a network in a form with which another computer can execute the program.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
a heater configured to heat a medium on which an image is formed;
a first temperature sensor configured to measure a temperature of the heater;
a second temperature sensor configured to measure a temperature of a region heated by the heater; and
processing circuitry configured to control the temperature of the heater, wherein the processing circuitry is configured to control the heater based on a comparison between a measured temperature of the first temperature sensor and a first threshold value, and a comparison between a measured temperature of the second temperature sensor and a second threshold value, wherein a third threshold value is set higher than the second threshold value, wherein the processing circuitry is configured to suspend operation of the image forming apparatus when the measured temperature of the second temperature sensor is higher than the third threshold value.

2. The image forming apparatus according to claim 1, wherein the processing circuitry is configured to control the temperature of the heater according to a type of the medium.

3. A method of controlling a heater included in an image forming apparatus and configured to heat a medium on which an image is formed, the method comprising:

measuring a temperature of the heater;

measuring a temperature of a region heated by the heater; and controlling the heater based on a comparison of the measured temperature of the heater and a first threshold value, and a comparison of the measured temperature of the region and a second threshold value, wherein the controlling further comprises suspending operation of the image forming apparatus when the measured temperature of the region is higher than a third threshold value which is set higher than the second threshold value.

4. The method according to claim 3, wherein the controlling further comprises controlling the temperature of the heater according to a type of the medium.

5. An image forming apparatus comprising:

a heater heating a medium;

a first temperature sensor measuring a temperature of the heater;

a second temperature sensor measuring a temperature of a region heated by the heater; and a processor controlling the temperature of the heater, the processor directing the heater to turn on only when the temperature measured by the first temperature sensor is lower than a second threshold value and the temperature measured by the second temperature sensor is lower than a first threshold value, wherein the first threshold value is lower than the second threshold value.

6. The image forming apparatus according to claim 5, wherein the processor changes the second threshold value according to a type of the medium.

7. The image forming apparatus according to claim 5, further comprising:

a conveyor transferring the medium; and a third temperature sensor disposed on the conveyor and in vicinity of the heater.

8. The image forming apparatus according to claim 7, wherein the processor operates the heater only when the temperature measured by the second temperature sensor is lower than the first threshold value, the temperature measured by the first temperature sensor is lower than the second threshold value, and a temperature measured by the third temperature sensor is lower than a third threshold value.

9. The image forming apparatus according to claim 7, wherein the third threshold value is substantially same as the second threshold value.

* * * * *